United States Patent
Chen

(10) Patent No.: US 9,899,860 B2
(45) Date of Patent: Feb. 20, 2018

(54) CHARGING METHOD, APPARATUS AND SYSTEM, CHARGER, AND CHARGEABLE DEVICE

(71) Applicant: Spreadtrum Communications (Shanghai) Co., Ltd., Zhangjiang, Shanghai (CN)

(72) Inventor: Liangjin Chen, Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 168 days.

(21) Appl. No.: 14/868,939

(22) Filed: Sep. 29, 2015

(65) Prior Publication Data

US 2016/0190848 A1 Jun. 30, 2016

(30) Foreign Application Priority Data

Dec. 31, 2014 (CN) .......................... 2014 1 0855596

(51) Int. Cl.
*H02J 7/04* (2006.01)
*H02J 7/00* (2006.01)

(52) U.S. Cl.
CPC .......... *H02J 7/0077* (2013.01); *H02J 7/0052* (2013.01)

(58) Field of Classification Search
CPC .............................. H02J 7/0077; H02J 7/0052
USPC ................................................. 320/162, 139
See application file for complete search history.

(56) References Cited

U.S. PATENT DOCUMENTS

| | | | | |
|---|---|---|---|---|
| 5,557,189 A | * | 9/1996 | Suzuki | H01M 10/44 320/119 |
| 7,227,333 B2 | * | 6/2007 | Yamada | H01M 10/46 320/106 |
| 7,615,753 B2 | * | 11/2009 | Audebert | G01T 1/17 250/370.07 |
| 8,539,265 B2 | * | 9/2013 | Chen | G06F 1/30 361/93.1 |
| 8,816,591 B2 | * | 8/2014 | Chu | H05B 33/0824 315/193 |

(Continued)

FOREIGN PATENT DOCUMENTS

| | | |
|---|---|---|
| CN | 103236568 A | 8/2013 |
| CN | 103683357 A | 3/2014 |
| JP | 2000073933 A | 3/2000 |

OTHER PUBLICATIONS

Chinese 1st Office Action corresponding to Patent No. 201410855596.3; dated Apr. 20, 2016, with English summary.

(Continued)

*Primary Examiner* — M'Baye Diao
(74) *Attorney, Agent, or Firm* — Cantor Colburn LLP

(57) ABSTRACT

A charging method, a charging apparatus, a charger, a chargeable device and a charging system are provided. The charging method includes: acquiring a first current value of a control current from a chargeable device; acquiring a first voltage value corresponding to the acquired first current value of the control current based on a preset relation, wherein the preset relation represents correlations between current values and voltage values; and adjusting a voltage value of an output voltage of a charger to the acquired first voltage value corresponding to the first current value of the control current. Accordingly, capability of the charger can be fully used, and fast charging can be achieved.

17 Claims, 8 Drawing Sheets

(56) References Cited

U.S. PATENT DOCUMENTS

| | | | | |
|---|---|---|---|---|
| 9,014,044 B2* | 4/2015 | Li | ............... | H04W 24/10 |
| | | | | 370/252 |
| 9,047,782 B1* | 6/2015 | Lee | ............... | G08G 1/168 |
| 9,077,195 B2* | 7/2015 | Wada | ............... | H02J 7/0055 |
| 9,099,883 B2* | 8/2015 | Ahn | ............... | H02J 7/0077 |
| 9,276,565 B2* | 3/2016 | Tomita | ............... | H03K 3/017 |
| 9,276,601 B2* | 3/2016 | Wu | ............... | H03M 1/462 |
| 2003/0206021 A1* | 11/2003 | Laletin | ............... | G01R 31/3631 |
| | | | | 324/426 |
| 2006/0259098 A1* | 11/2006 | Erickson | ............... | A61N 1/3787 |
| | | | | 607/61 |
| 2011/0150187 A1* | 6/2011 | Boudry | ............... | H05G 1/46 |
| | | | | 378/207 |
| 2012/0185190 A1* | 7/2012 | Okumura | ............... | G01R 31/3651 |
| | | | | 702/63 |
| 2013/0093384 A1* | 4/2013 | Nyu | ............... | G01R 31/3606 |
| | | | | 320/107 |
| 2014/0009114 A1* | 1/2014 | Nishio | ............... | B60L 11/1844 |
| | | | | 320/109 |
| 2014/0253051 A1 | 9/2014 | Hu et al. | | |
| 2014/0361740 A1* | 12/2014 | Suzuki | ............... | H02J 7/0027 |
| | | | | 320/108 |
| 2015/0188351 A1 | 7/2015 | Jiang et al. | | |
| 2015/0357837 A1* | 12/2015 | Takai | ............... | H01M 10/44 |
| | | | | 320/107 |
| 2016/0072319 A1* | 3/2016 | Ma | ............... | H02J 7/007 |
| | | | | 320/162 |
| 2016/0084894 A1* | 3/2016 | Govindaraj | ............... | G01R 25/00 |
| | | | | 307/104 |
| 2016/0190849 A1* | 6/2016 | Chen | ............... | H02J 7/0093 |
| | | | | 320/107 |

OTHER PUBLICATIONS

Jin Jun et al., "Design of the lithium-ion battery charger based on portable computer", China Academic Journal Electronic Publishing House, Aug. 2006 vol. 30 No. 8, pp. 672-676.

* cited by examiner

CHARGING METHOD, APPARATUS AND SYSTEM, CHARGER, AND CHARGEABLE DEVICE

CROSS-REFERENCE TO RELATED APPLICATIONS

The present application claims priority to Chinese patent application No. 201410855596.3, filed on Dec. 31, 2014, and entitled "CHARGING METHOD, APPARATUS AND SYSTEM, CHARGER, AND CHARGEABLE DEVICE", the entire disclosure of which is incorporated herein by reference.

TECHNICAL FIELD

The present disclosure generally relates to charging techniques, and more particularly, to a charging method, a charging apparatus, a charger, a chargeable device and a charging system.

BACKGROUND

Existing standard chargers generally have fixed output voltages, such as 5V. However, output currents of these chargers may vary with nominal parameters thereof. The output current of the standard changer may range from 300 mA to 1800 mA.

An exiting standard USB (Universal Serial Bus) charger generally includes four pins: a VBUS pin, a DP pin, a DM pin, and a GND pin. The VBUS pin is an output pin of the USB charger, while the DP pin and the DM pin are two signal pins of the USB charger. When charging a chargeable device, such as a mobile phone or other mobile terminals, via a charger, the chargeable device is adapted to determine whether the present charger is the standard charger by detecting whether the DP pin and the DM pin are shorted. When the present charger is determined as the standard charger, the chargeable device is charged with a preset fixed output voltage.

However, in some circumstances, the charging capability of the charger is not fully used. That is because, the chargeable device is always charged with a preset fixed output voltage, regardless of the output capability of the charger.

SUMMARY

An object of the present disclosure is to make full use of the output capability of a charger, thus achieving fast charging.

According to one embodiment of the present disclosure, a charging method is provided. The charging method includes: acquiring a first current value of a control current from a chargeable device; acquiring a first voltage value corresponding to the acquired first current value of the control current based on a preset relation, wherein the preset relation represents correlations between current values and voltage values; and adjusting a voltage value of an output voltage of a charger to the acquired first voltage value corresponding to the first current value of the control current.

In some embodiments, the charging method further includes: receiving a detecting current sent from the chargeable device; and sending a feedback signal to the chargeable device when a time period of receiving the detecting current reaches a preset value, where the first current value of the control current is acquired from the chargeable device after the feedback signal is sent to the chargeable device.

In some embodiments, the charging method further includes: after adjusting the voltage value of the output voltage of the charger to the first voltage value, resetting the voltage value of the output voltage of the charger into a default value when the acquired first current value of the control current becomes zero.

In some embodiments, the preset relation includes a linear relation or a non-linear relation.

According to one embodiment of the present disclosure, a charging apparatus is provided. The charging apparatus includes: a first acquiring unit configured to acquire a first current value of a control current from a chargeable device; a second acquiring unit configured to acquire a first voltage value corresponding to the acquired first current value of the control current based on a preset relation, wherein the preset relation represents correlations between current values and voltage values; and an adjusting unit configured to adjust a voltage value of an output voltage of a charger to the first voltage value corresponding to the first current value of the control current.

In some embodiments, the charging apparatus further includes a detecting unit, wherein the detecting unit is configured to: receive a detecting current from the chargeable device; and send a feedback signal to the chargeable device when a time period of receiving the detecting current reaches a preset value.

In some embodiments, the charging apparatus further includes a resetting unit, wherein the resetting unit is configured to: reset the voltage value of the output voltage of the charger into a default value when the acquired first current value of the control current becomes zero.

According to one embodiment of the present disclosure, a charger is provided. The charger includes: a detecting circuit, a feedback circuit and a voltage converter; wherein the detecting circuit includes a comparing unit and a resistor; wherein the resistor has a first end coupled with a current input terminal of the charger, and a second end coupled with ground; wherein the comparing unit includes at least four comparators which have different threshold values, first input terminals of the at least four comparators are all input with a voltage drop of the resistor, second input terminals of the at least four comparators are respectively input with the threshold values thereof, output terminals of the at least four comparators are all coupled with the feedback circuit; wherein the feedback circuit is disposed between the detecting circuit and the voltage converter, and is configured to: convert comparison results output from the at least four comparators into control signals, and send the control signals to the voltage converter; and wherein the voltage converter is coupled with the feedback circuit, and is configured to adjust an output voltage of the charger based on the control signals.

In some embodiments, the detecting circuit further includes a logic controller and a switching unit; wherein the logic controller is coupled with the output terminals of the comparators, and is configured to: receive the comparison results from the comparators, start recording time if the threshold values of at least two of the comparators are less than a value of a voltage drop of the resistor, and switch on the switching unit when the recorded time reaches a preset value; and wherein the switching unit is coupled with the logic controller, and is configured to reduce a resistance of the resistor when being switched on.

In some embodiments, the switching unit includes any one of: a NMOS transistor, a PMOS transistor, a triode, and an electric relay.

In some embodiments, the switching unit includes a NMOS transistor, the resistor includes a first resistor and a second resistor; wherein the first resistor has a first end coupled with the first input terminals of the at least four comparators, and a second end coupled with a drain of the NMOS transistor; wherein the second resistor has a first end coupled with the drain of the NMOS transistor, and a second end coupled with ground; and wherein the NMOS transistor has a gate coupled with the logic controller, and a source coupled with ground.

In some embodiments, the switching unit includes a NMOS transistor, the resistor includes a first resistor and a second resistor; wherein the first resistor has a first end coupled with a source of the NMOS transistor, and a second end coupled with ground; wherein the second resistor has a first end coupled with a drain of the NMOS transistor and the first input terminals of the at least four comparators, and a second end coupled with the source of the NMOS transistor; and wherein the NMOS transistor has a gate coupled with the logic controller.

In some embodiments, the switching unit includes a NMOS transistor, the resistor includes a first resistor and a second resistor; wherein the first resistor has a first end coupled with the first input terminals of the at least four comparators, and a second end coupled with a drain of the NMOS transistor; wherein the second resistor has a first end coupled with the first end of the first drawdown resistor, and a second end coupled with a source of the NMOS transistor; and wherein a gate of the NMOS transistor is coupled with the logic controller, and the source of the NMOS transistor is coupled with ground.

In some embodiments, the switching unit includes a NMOS transistor, the resistor includes a first resistor and a second resistor; wherein the first resistor has a first end coupled with a source of the NMOS transistor, and a second end coupled with ground; wherein the second resistor has a first end coupled with a drain of the NMOS transistor, and a second end coupled with ground; and wherein a gate of the NMOS transistor is coupled with the logic controller, the drain of the NMOS transistor is coupled with the first input terminals of the at least four comparators.

In some embodiments, the voltage converter includes an AC-DC converter, or a DC-DC converter.

In some embodiments, the voltage converter includes an AC-DC converter, and the feedback circuit includes an isolator which is configured to physically isolate the AC-DC converter and the detecting circuit.

In some embodiments, the isolator includes a light coupling device.

According to one embodiment of the present disclosure, a chargeable device is provided. The chargeable device includes a variable current source and a controller; wherein the controller is configured to control the variable current source to output a control current having a controlled current value; and wherein the variable current source is configured to send the control current with the controlled current value to a charger based on a control instruction from the controller.

In some embodiments, the chargeable device further includes a comparator, wherein the comparator has a first input terminal input with a voltage drop of a detecting circuit in the charger, and a second input terminal input with a threshold value of the comparator; and wherein the comparator is configured to compare a value of the voltage drop in the detecting circuit and the threshold value of the comparator, and send a comparison result to the controller.

In some embodiments, the chargeable device further includes an ADC circuit, wherein the ADC circuit is coupled with the controller; and wherein the ADC circuit is configured to obtain the voltage drop of the detecting circuit, and send the voltage drop in the detecting circuit to the controller.

According to one embodiment of the present disclosure, a charging system is provided. The charging system includes a charger and a chargeable device; wherein the chargeable device is configured to send a control current to the charger; and wherein the charger is configured to: acquire a first voltage value corresponding to a first current value of the control current based on a preset relation, wherein the preset relation represents correlations between current values and voltage values, and adjust a value of an output voltage thereof to the first voltage value corresponding to the first current value of the control current.

In comparison with prior art, technique solutions provided by the present disclosure have following advantages.

When charging a chargeable device via the charger provided by the present disclosure, a voltage value corresponding to a value of the control current can be obtained according to a preset relation wherein the preset relation represents correlations between current values and voltage values; and then the output voltage of the charger is adjusted to the voltage value. In this way, an output voltage of the charger is adjusted through the chargeable device. Furthermore, an output power of the charger is increased with the increase of the voltage value of the output voltage of the charger. Accordingly, a power input into the chargeable device is also increased, that is, a current input into the chargeable device is increased. As such, an output capability of the charger can be fully used, and fast charging can be achieved.

Moreover, before acquiring the control current from the chargeable device, a detecting current is sent from the chargeable device to the charger, so as to effectively reduce noise interference. Specifically, the charger is configured to record a time period of receiving the detecting current. Only when the time period recorded reaches a preset value, a feedback signal is sent to the chargeable device, thus sending the control current to the charger.

In addition, when a current value of the control current sent from the chargeable device becomes zero, which means the chargeable device does not send any current to the charger. It could be concluded that the chargeable device and the charger are disconnected with each other. In this case, the output voltage of the charger is reset to a default value for safely charging next time. For example, when the charger is used for charging another chargeable device, the chargeable device can be prevented from being damaged due to a high output voltage of the charger.

DETAILED DESCRIPTION

An exiting standard USB (Universal Serial Bus) charger generally includes four pins: a VBUS pin, a DP pin, a DM pin, and a GND pin. The VBUS pin is an output pin of the USB charger, the DP pin and the DM pin are two signal pins of the USB charger. When charging a chargeable device, such as a mobile phone or other mobile terminals, via a charger, the chargeable device is adapted to determine whether the present charger is the standard charger by detecting whether the DP pin and the DM pin are shorted. When the present charger is determined as the standard charger, the chargeable device is charged with a preset fixed output voltage. However, in some circumstances, a charging capability of the charger is not fully used. That is because, the chargeable device is always charged with a preset fixed output voltage, regardless of an output capability of the charger.

In the present disclosure, when charging a chargeable device via a charger, a first voltage value corresponding to a first current value of a control current can be obtained according to a preset relation, wherein the preset relation represents correlations between current values and voltage values; and then the output voltage of the charger is adjusted to the first voltage value. By such way, an output voltage of the charger is adjusted by the chargeable device. Furthermore, under condition that an output current of the charger remain unchanged, an output power of the charger is increased with the increase of the voltage value of the output voltage of the charger. Accordingly, a power input into the chargeable device is also increased, that is, a current input into the chargeable device is increased. As such, an output capability of the charger can be fully used, and fast charging can be achieved.

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
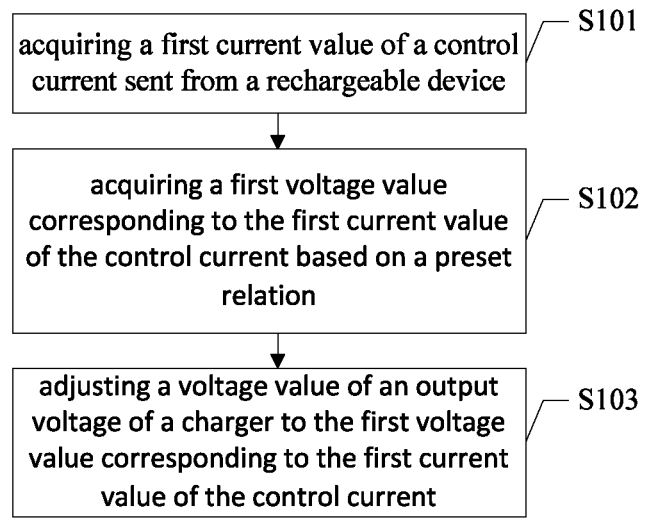
FIG. 1 schematically illustrates a flow chart of a charging method according to one embodiment of the present disclosure.

Referring to FIG. 1, a charging method according to one embodiment of the present disclosure is illustrated. The charging method includes three steps which are respectively from step S101 to step S103.

In step S101, acquiring a first current value of a control current sent from a chargeable device.

In some embodiments of the present disclosure, the chargeable device may be any device configured with an apparatus adapted to store electric energy. In some embodiments of the present disclosure, the method may be implemented by a charger with a USB (Universal Serial Bus) port, thus the chargeable device communicates, such as exchanges information and transmits electric current, with the charger through the USB port. In some embodiments of the present disclosure, the chargeable device may be a mobile terminal or a tablet computer. In some embodiments of the present disclosure, the chargeable device may be a power bank or a mobile power device. In some embodiments of the present disclosure, the chargeable device may be other devices. The form of the chargeable device should not taken as a limitation of the present disclosure, as long as an apparatus adapted to store electric energy is included.

In some embodiments of the present disclosure, the first current value of the control current is sent to the charger via the chargeable device. In some embodiments of the present disclosure, a variable current source is configured in the chargeable device, wherein an output current of the variable current source can be adjusted, thus sending control currents having various controlled current values to the charger.

In some embodiments of the present disclosure, the charger is configured with a current detecting device, so as to acquire the current value of the control current output from the variable current source in the chargeable device. The current detecting device may be an ADC (Analog to Digital Converter), a comparator, or other devices, as long as the current value of the control current sent from the chargeable device can be obtained.

It can be understood that, in some embodiments of the present disclosure, the charger is also adapted to convert the control current, sent from the chargeable device, into a corresponding voltage. For example, the charger is configured with a resistor unit having a fixed resistance. Thus, through detecting a voltage value of a voltage between two ends of the resistor unit, the current value of the control current sent from the chargeable device can be obtained.

In step S102, acquiring a first voltage value corresponding to the first current value of the control current according to a preset relation, wherein the preset relation represents correlations between current values and voltage values.

In some embodiments of the present disclosure, the correlations between current values and voltage values are preset in the charger, which may be linear, non-linear, or partially linear and partially non-linear. In other words, the preset relation may be a linear relation, a non-linear relation, or a partially linear and partially non-linear relation. Based on the preset relation, the voltage value of the output voltage of the charger can be acquired when the current value of the control current, sent from the chargeable device, is acquired. Thereafter, step S103 may be implemented.

For example, as shown in Table 1, correlations between current values and voltage values according to one embodiment of the present disclosure is illustrated, which are linear.

TABLE 1

| current values | voltage values |
|---|---|
| 0.6 mA | 3.6 V |
| 1.2 mA | 3.8 V |
| 1.8 mA | 4.0 V |
| 2.4 mA | 4.2 V |
| 3.0 mA | 4.5 V |
| 3.6 mA | 5 V |
| 4.2 mA | 7 V |
| 4.8 mA | 9 V |
| 5.4 mA | 12 V |

Accordingly, supposing the first current value of the control current sent from the chargeable device and acquired by the charger is 1.2 mA, from Table 1, it can be seen that, the first voltage value corresponding to the first current value of the control current (i.e. 1.2 mA) is 3.8V. Similarly, supposing the first current value of the control current sent from the chargeable device and acquired by the charger is 4.2 mA, from Table 1, it can be seen that, the first voltage value corresponding to the first current value of the control current (i.e. 4.2 mA) is 7V.

For another example, as shown in Table 2, correlations between current values and voltage values according to another embodiment of the present disclosure is illustrated, which are partially linear and partially non-linear.

TABLE 2

| current values | voltage values |
|---|---|
| 1 mA | 3.6 V |
| 1.5 mA | 3.8 V |
| 2 mA | 4.0 V |
| 2.5 mA | 4.2 V |
| 3 mA | 4.5 V |
| 3.6 mA | 5 V |
| 4 mA | 7 V |
| 5 mA | 9 V |
| 6 mA | 12 V |

In practice, the correlations between current values and voltage values may be completely non-linear. The correlations between current values and voltage values may be designed according to precisions of the comparators, the variable current source in the chargeable device, and the resistor, which will not be described in detail herein.

In step S103, adjusting a voltage value of an output voltage of a charger to the first voltage value corresponding to the first current value of the control current.

In some embodiments of the present disclosure, after the first voltage value corresponding to the first current value of the control current is acquired based on the preset relation, the voltage value of the output voltage of the charger is adjusted to the first voltage value corresponding to the first current value of the control current.

For example, supposing a voltage value of a present output voltage of the charger is 5V, the first current value of the control current sent from the chargeable device is 4.8 mA, from Table 1, it can be seen that, the first voltage value corresponding to 4.8 mA is 9V. Thus, the voltage value of the output voltage of the charger is adjusted to 9V.

For another example, supposing a voltage value of a present output voltage of the charger is 5V, the first current value of the control current sent from the chargeable device is 1.8 mA, from Table 1, it can be seen that, the first voltage value corresponding to 1.8 mA is 4.0V. Thus, the voltage value of the output voltage of the charger is adjusted to 4.0V.

It can be seen that, the voltage value of the output voltage of the charger is adjusted based on the first current value of the control current sent from the chargeable device to the charger. Specifically, the voltage value of the output voltage of the charger is acquired based on a preset relation, wherein the preset relation represents correlations between current values and voltage values, and wherein the first control current is sent from the chargeable device to the charger. Accordingly, an adjustment to the output voltage of the charger is achieved. Furthermore, with the increase of the voltage value of the voltage output from the charger, under the condition that an output current of the charger keeps constant, a power of the charger is increased. Correspondingly, an effective current input into the chargeable device (specifically, the apparatus therein adapted to store electric energy, such as a battery) is increased. In other words, the current input into the chargeable device is increased. Therefore, an output capability of the charger can be sufficiently used, thus achieving fast charging.

In some embodiments of the present disclosure, before sending the control current to the charger, the chargeable device sends a detecting current to the charger, so as to detect if the charger is suitable for receiving the control current from the chargeable device. Thus, adjustment to the output voltage of the charger can be achieved. If the charger is detected, by the chargeable device, having a voltage drop after receiving the detecting current for a preset time period, the charger is determined as suitable for receiving the control current. In this case, the charger is defined as in a state that ready for receiving the control current.

It can be seen that, the charger enters into the state ready for receiving the control current, after a time period of receiving the detecting current reaches a preset value. In this case, the charger sends a feedback signal to the chargeable device. The chargeable device sends the control current to the charger after the feedback signal is received, thus adjusting the voltage value of the output voltage of the charger. As such, a false operation caused by noise interference can be avoided.

In practice, after voltage value of the output voltage is adjusted based on the correlations between current values and voltage values, the charger is adapted to charge the chargeable device with the adjusted output voltage. Accordingly, during the charging process, the voltage value of the output voltage of the charger is adjusted. Thus, when the charging process is finished, such as when the chargeable device and the charger are disconnected, the output voltage of the charger may be in a high value. For example, when the chargeable device and the charger are disconnected, the output voltage of the charger is 12V. However, when using this charger, which has an output voltage of 12V, to charge another chargeable device, for example, to charge a chargeable device which has a nominal input voltage of 5V, the charging process may unable to be implement, or even cause damage to the chargeable device.

Figure 2:
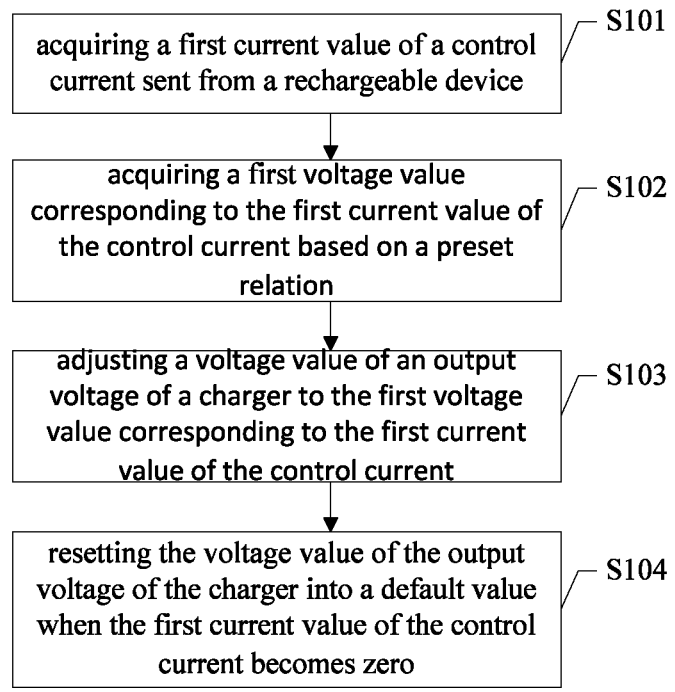
FIG. 2 schematically illustrates a flow chart of a charging method according to another embodiment of the present disclosure.

In order to solve the problem recited above, another charging method is provided by the present disclosure, as shown in FIG. 2. The charging method further includes a step S104 after step S103, in comparison with the method shown in FIG. 1.

In step S104, resetting the voltage value of the output voltage of the charger into a default value when the acquired first current value of the control current becomes zero.

In some embodiments of the present disclosure, when the charging process is finished, such as the chargeable device and the charger are disconnected or the charger is unplugged from the chargeable device, the chargeable device can not send the control current to the charger any more. In other words, the first current value of the control current, received by the charger from the chargeable device, becomes zero. In this case, the voltage value of the output voltage of the charger is reset to a default value.

For example, before the chargeable device is unplugged from the charger, the output voltage of the charger is adjusted to 12V based on the control current from the chargeable device. When the first current value of the control current from the chargeable device and received by the charger becomes zero, the chargeable device is determined as being unplugged from the charger. In this case, the voltage value of the output voltage of the charger is reset to the default value which is 5V.

It can be seen that, when the current value of the control current sent from the chargeable device is zero, that is, the chargeable device does not send the control current to the charger any more, the chargeable device is taken as unplugged from the charger. In this case, the voltage value of the output voltage of the charger is reset to the default value. As such, when using the charger to charging another chargeable device, a mismatching between the output voltage of the charger and the nominal voltage of the chargeable device can be avoided. Therefore, damages to the chargeable device, when the output voltage of the charger is high, can be avoided. Or, failing to charge the chargeable device, when the output voltage of the charger is low, can be avoided.

Figure 3:
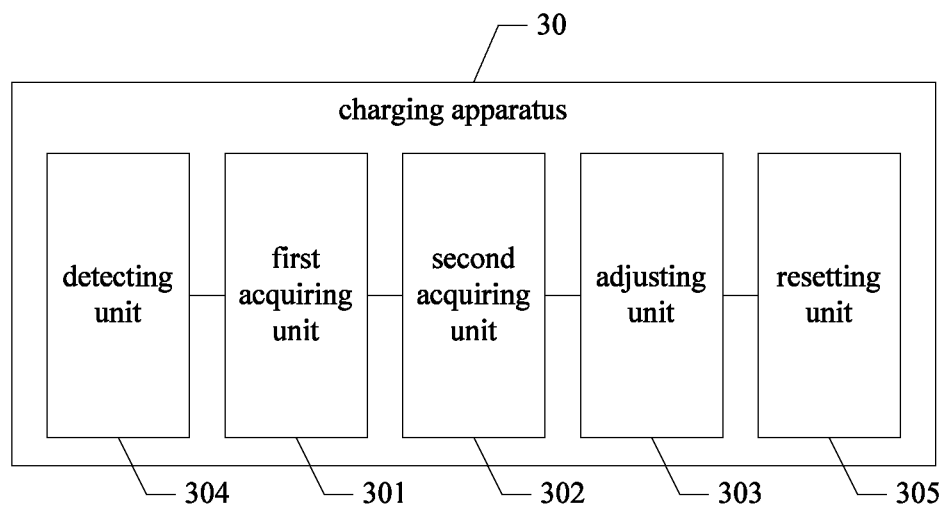
FIG. 3 schematically illustrates a structure of a charging apparatus according to one embodiment of the present disclosure.

Referring to FIG. 3, a charging apparatus 30 is provided, which includes a first acquiring unit 301, a second acquiring unit 302 and an adjusting unit 303.

The first acquiring unit 301 is configured to acquire a first current value of a control current from a chargeable device.

The second acquiring unit 302 is configured to acquire a first voltage value based on the first current value and a preset relation, wherein the preset relation represents correlations between current values and voltage values.

The adjusting unit 303 is configured to adjust a voltage value of an output voltage of a charger into to the first voltage value.

In some embodiments of the present disclosure, the charging apparatus 30 further includes a detecting unit 304. The detecting unit 304 is configured to: receive a detecting current from the chargeable device; and when a time period of receiving the detecting current reaches a preset value, send a feedback signal to the chargeable device, thus acquiring, by the first acquiring unit 301, the first current value of the control current from a chargeable device.

In some embodiments of the present disclosure, the charging apparatus 30 further includes a resetting unit 305. The resetting unit 305 is configured to: resetting the voltage value of the output voltage of the charger into a default value when the acquired first current value of the control current becomes zero.

Figure 4:
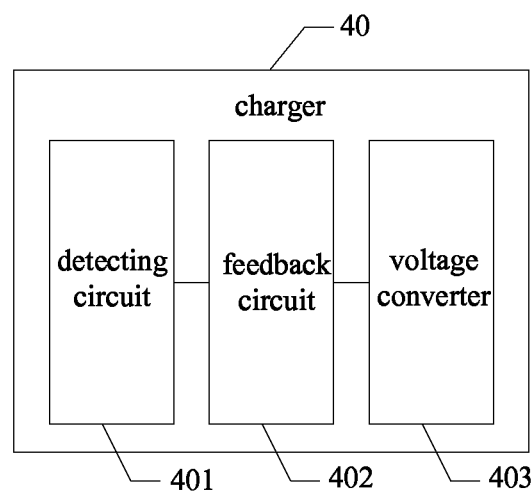
FIG. 4 schematically illustrates a structure of a charger according to one embodiment of the present disclosure.

Referring to FIG. 4, a charger 40 according to one embodiment of the present disclosure is illustrated. The charger 40 includes: a detecting circuit 401, a feedback circuit 402, and a voltage converter 403, wherein the detecting circuit 401 includes a comparing unit and a resistor.

In some embodiments of the present disclosure, the resistor has a first end coupled with a current input port of the charger 40 and a second end coupled with ground. As the first end of the resistor is coupled with the current input port of the charger 40, when a chargeable device inputs a current to the charger 40, a voltage drop is generated in the resistor. The current input into the charger 40 by the chargeable device is I, the resistor has a resistance of R, the voltage drop generated in the resistor is U, wherein U=I×R.

For example, when the resistor has a resistance of 1 KΩ, and the current input to the charger 40 by the chargeable device is 0.6 mA, then the voltage drop generated in the resistor is 0.6V.

The comparing unit includes at least four comparators which have different threshold values. Each of the at least four comparators has a first input terminal and a second input terminal, wherein the first input terminals of the comparators are input with the voltage drop of the resistor, and the second input terminals of the comparators are respectively input with the threshold values thereof. Further, the first input terminals and the second input terminals are all coupled with the feedback circuit 402.

In some embodiments of the present disclosure, a number of comparators included in the comparing unit is n+1, wherein n≥3, and threshold values of these comparators are different from each other. Each of the comparators has a first input terminal and a second input terminal, wherein the first input terminals of the comparators are input with the voltage drop of the resistor, and the second input terminals of the comparators are respectively input with the threshold values thereof. Each of the comparators implement a comparison between the voltage drop of the resistor and the threshold value thereof, generate a comparison result, and input the comparison result into the feedback circuit 402.

For example, the n+1 comparators are respectively a comparator A0, a comparator A1, a comparator A2, . . . , and a comparator An. A threshold value of the comparator A0 is VT0, a threshold value of the comparator A1 is VT1, a threshold value of the comparator A2 is VT2, a threshold value of the comparator An is VTn, wherein VT0<VT1<VT2< . . . <VTn. Regarding one of the comparators, if a value input into the first input terminal is greater than a value input into the second input terminal, the comparison result thereof is indicated as a high level "1", thus the comparator output the high level "1"; and if a value input into the first input terminal is smaller than a value input into the second input terminal, the comparison result thereof is indicated as a low level "0", thus the comparator output the low level "0".

In some embodiments of the present disclosure, the threshold values of the comparators are selected by a way recited as following.

Supposing the current value of the control current acquired from the chargeable device is I, then the voltage drop corresponding to the resistor in the detecting unit is U, wherein U=I×R. When I=$I_1$, VT1<U=$I_1$×R<VT2; when I=$I_2$, VT2<U=$I_2$×R<VT3; and so forth, when I=$I_n$, VTn<U=$I_n$×R, wherein $I_1$<$I_2$< . . . <$I_n$.

In other words, when I=$I_1$, the comparator A0 and the comparator A1 output a high level; when I=$I_1$, the comparator A0, the comparator A1 and the comparator A2 output a high level; and when I=$I_n$, all the n+1 comparators output a high level.

For example, when the resistor has a resistance of R, R=1KΩ, and the current input to the charger 40 by the chargeable device is I, I=$I_2$=1.2 mA, then the comparison results output from the comparators are respectively: 1, 1, 1, 0, 0, 0, . . . , 0. In other words, only the comparator A0, the comparator A1 and the comparator A2 output a high level, all the other comparators output a low level.

The feedback circuit 402 is disposed between the detecting circuit 401 and the voltage converter 403. The feedback circuit 402 is configured to: convert the comparison results output from the comparators in the comparing unit into control signals; and send the control signals to the voltage converter 403, wherein the comparators have different threshold values.

In some embodiments of the present disclosure, the feedback circuit 402 is adapted to: when the comparison results output from the comparators are acquired, obtain a present current value of the control current based on the comparison results output from the comparators; and obtain a corresponding voltage value of an output voltage of the charger based on the present current value obtained and the preset relation, wherein the present relation represents correlations between voltage values and current values.

For example, the comparison results output from the comparators acquired by the feedback circuit 402 are respectively: 1, 1, 1, 1, 0, 0, . . . , 0. In other words, the comparator A0, the comparator A1, the comparator A2 and the comparator A3 output a high level. Therefore, the present current value of the control current is equal to $I_3$. According to Table 1, it can be concluded that, $I_1$=0.6 mA, $I_2$=1.2 mA, $I_3$=1.8 mA, thus the current value of the control current is 1.8 mA. Further referring to Table 1, the voltage value corresponding to 1.8 mA is 4.0V. Thus, the output voltage of the charger is supposed to be adjusted to 4.0V. Accordingly, a corresponding control signal is sent from the feedback circuit 402 to the voltage converter 403, thus adjusting the output voltage of the charger into 4.0V.

For another example, the comparison results output from the comparators acquired by the feedback circuit 402 are respectively: 1, 1, 1, 0, . . . , 0. In other words, the comparator A0, the comparator A1, and the comparator A2 output a high level. Therefore, the present current value of the control current is equal to $I_2$. According to Table 2, it can be concluded that, $I_1$=1 mA, $I_2$=1.5 mA, $I_3$=2 mA, thus the current value of the control current is 2 mA. Further referring to Table 2, the voltage value corresponding to 2 mA is 4.0V. Thus, the output voltage of the charger is supposed to be adjusted to 4.0V. Accordingly, a corresponding control signal is sent from the feedback circuit 402 to the voltage converter 403, thus adjusting the output voltage of the charger into 4.0V.

The voltage converter 403 is coupled with the feedback circuit 402, and configured to adjust the output voltage of the charger according to the control signal.

In some embodiments of the present disclosure, the voltage converter 403 is adapted to: when the control signal from the feedback circuit 402 is received, obtain a value of the output voltage of the charger corresponding to the current value of the control current; and adjust the output voltage of the charger into the value corresponding to the control signal.

In some embodiments of the present disclosure, the voltage converter 403 may be an AC-DC (Alternating Current to Direct Current) converter, or a DC-AC (Direct Current to Alternating Current) converter. When the voltage converter 503 is the AC-DC converter, for safety sake, an isolator may be disposed between the AC-DC converter and the detecting circuit 401. The isolator is adapted to physically isolate the AC-DC converter and the detecting circuit 401, so as to avoid dangers caused by accidentally touching the detecting circuit 401. In some embodiments of the present disclosure, the isolator is part of the feedback circuit. In other words, the feedback circuit includes the isolator.

In some embodiments of the present disclosure, the isolator is a light coupling device. In some embodiments of the present disclosure, the isolator may be configured into other devices, as along as the AC-DC converter and the detecting circuit 401 can be physically isolated from each other. Herein, the configuration of the isolator will not be described in detail.

In some embodiments of the present disclosure, the detecting circuit 401 further includes: a logic controller and a switching unit.

The logic controller, which is coupled with the output terminals of the comparators, is configured to: receive the comparison results from the comparators; start recording time if a corresponding voltage drop of the resistor is greater than VT1; when the recorded time reaches a preset value, switch on the switching unit, in this case, a resistance of the resistor is reduced, thus the voltage drop is reduced; send a feedback signal to the chargeable device to inform the chargeable device that the charger is suitable for receiving a control current, wherein the feedback signal is a voltage drop signal of the resistor.

The switching unit, which is coupled with the logic controller, is configured to: when being switched on, reduce the resistance of the resistor.

In some embodiments of the present disclosure, the comparing unit includes n+1 comparators which are respectively a comparator A0, a comparator A1, a comparator A2, . . . , and a comparator An, wherein n≥3. When at least two of the comparators output a high level, the logic controller starts to time. Further, when the recorded time reaches the preset value, the logic controller sends a control instruction to the switching unit, so as to switch on the switching unit. When the switching unit is switched on, a portion of the resistor is shorted, thus the resistance of the resistor is reduced. Moreover, when the switching unit is switched on, the comparison result of at least one comparator is high level "1". Accordingly, the voltage drop of the resistor is reduced, wherein a voltage drop signal of the resistor serves as a feedback signal and is sent to the chargeable device. The feedback signal is used to inform the chargeable device that the charger is suitable for receiving a control current.

In some embodiments of the present disclosure, the switching unit is a MOS (Metal Oxide Semiconductor) transistor. For example, the switching unit may be a NMOS transistor or a PMOS transistor. The switching unit may be a triode or an electric relay. The switching unit may be configured into other devices or circuits, as long as the switch function can be achieved and the resistance of the resistor can be reduced when being switched on.

Figure 5:
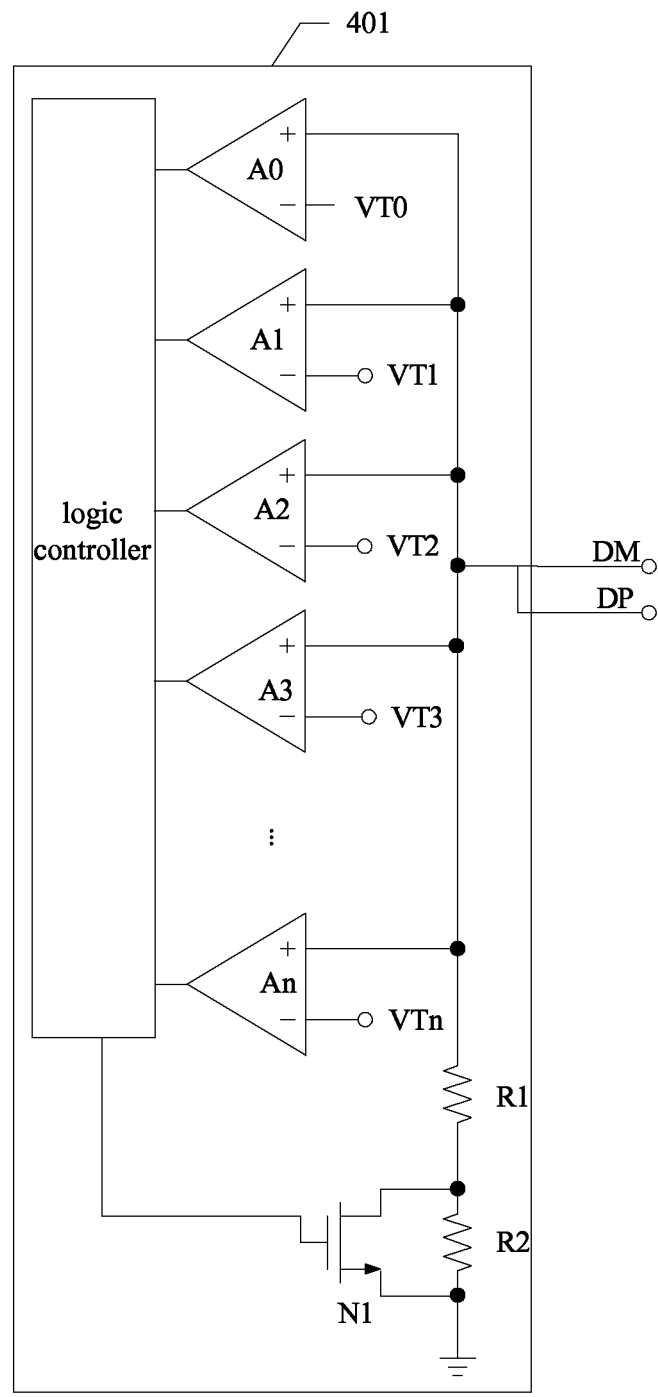
FIG. 5 schematically illustrates a structure of a detecting circuit according to one embodiment of the present disclosure.

Referring to FIG. 5, a structure of a detecting circuit 401 according to one embodiment of the present disclosure is illustrated.

As shown in FIG. 5, the resistor includes a first resistor R1, and a second resistor R2. A0, A1, A2, A3, . . . , and An are n+1 comparators of the comparing unit, wherein threshold values of the n+1 comparators are different from each other. Specifically, the threshold value of the comparator A0 is VT0, the threshold value of the comparator A1 is VT1, the threshold value of the comparator A2 is VT2, the threshold value of the comparator A3 is VT3, and the threshold value of the comparator An is VTn, wherein VT0<VT1<VT2<VT3< . . . <VTn. NMOS transistor N1 is the switching unit.

The charger is connected with the chargeable device through a USB (universal serial bus) cable, so as to charge the chargeable device. During the charging process, the chargeable device is adapted to send a detecting current and a control current to the charger via a DM/DP pin. Before sending the control current to the charger, the chargeable device sends the detecting current to the charger, so as to detect if the charger is adapted to receive the control current.

The chargeable device sends the detecting current $I_0$ to the charger through a variable current source. The voltage drop of the resistor is $U_0$, wherein $U_0=I_0\times(R1+R2)$, and $U_0>VT1$.

When the logic controller receives the comparison results of the n+1 comparators, and detects that at least the comparator A0 and the comparator A1 output as the high level "1", the logic controller starts recording time. When the recorded time reaches the preset value, such as 1s, the logic controller sends a control signal to a gate of the NMOS transistor N1, so as to switch on the NMOS transistor N1.

The second resistor R2 is coupled with a source and a drain of the NMOS transistor N1, thus when the NMOS transistor N1 is switched on, the second resistor R2 is shorted. In this case, a voltage drop in the charger corresponding to the detecting current is U', wherein $U'=I\times R1$, and $VT0<U'<VT1$. Therefore, after the second resistor R2 is shorted, only the comparator A0 output the high level.

As the charger is connected with the chargeable device, when the voltage drop in the detecting circuit 401 is reduced, that is, a voltage on the DM/DP pin is reduced to U'. Correspondingly, a voltage on the DM/DP pin of the chargeable device is also reduced to U'. Accordingly, it can be determined that, the charger currently connected is adapted to receive a control current. In other words, the chargeable device can send control current to the charger.

The chargeable device sends the control current to the charger, wherein a current value corresponding to the control current is I. The current value I of the control current is greater than the current value of the detecting current $I_0$. As the resistor R2 in the detecting circuit is shorted, a voltage drop in the detecting circuit $U=I\times R1$.

Supposing that, when $I=I_1$, $VT1<U=I_1\times R<VT2$, i.e. only the comparator A0 and the comparator A1 output the high level; when $I=I_2$, $VT2<U=I_2\times R<VT3$, i.e. the comparator A0, the comparator A1, and the comparator A3 output the high level; and when $I=I_n$, $VTn<U=I_n\times R$, i.e. the n+1 comparator all output the high level.

Figure 6:
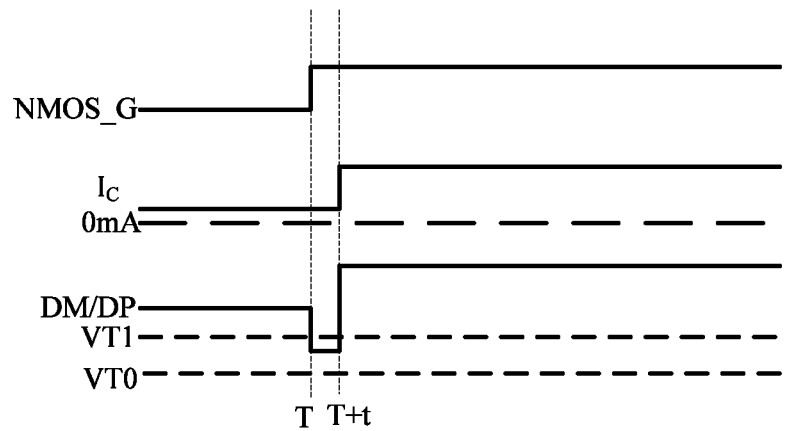
FIG. 6 schematically illustrates a working time sequence of a charger according to one embodiment of the present disclosure.

Referring to FIG. 6, a work timing sequence of a charger according to one embodiment of the present disclosure is illustrated. In FIG. 6, NMOS_G indicates an electric level of the gate G of the NMOS transistor N1, $I_c$ indicates a value of the current wave output from the variable current source, wherein $I_c>0$ mA by default. DM/DP indicates a voltage drop corresponding to the resistor of the detecting circuit of the charger. VT1 indicate the threshold value of the comparator A1.

Referring to FIG. 5 and FIG. 6, during a time period from 0 to T, a value $I_c$ of a current sent from the chargeable device is equal to that of the detecting current $I_0$. In the charger, a value of the voltage drop DM/DP corresponding to the detecting current $I_0$ is larger than that of the threshold value VT1 of the comparator A1. When time recorded by the logic controller reaches the preset value T, the logic controller sends a high level signal to the gate G of the NMOS transistor N1. Thus, the NMOS transistor N1 is switched on, R2 is shorted, and DM/DP voltage is drew down to a value lager than that of VT0 and smaller than that of the VT1. Accordingly, the charger enters into a state of ready for receiving a control current sent from the chargeable device.

At a time point of T+t, the chargeable device detects that the voltage on DM/DP changes, and sends a control current having a current value I. Thus, the voltage on DM/DP is elevated up to a value greater than VT1. In this case, the charger is in a state of receiving the control current from the chargeable device. Therefore a value of the output voltage of the charger is adapted to be adjusted according to a current value of the control current.

Figure 7:
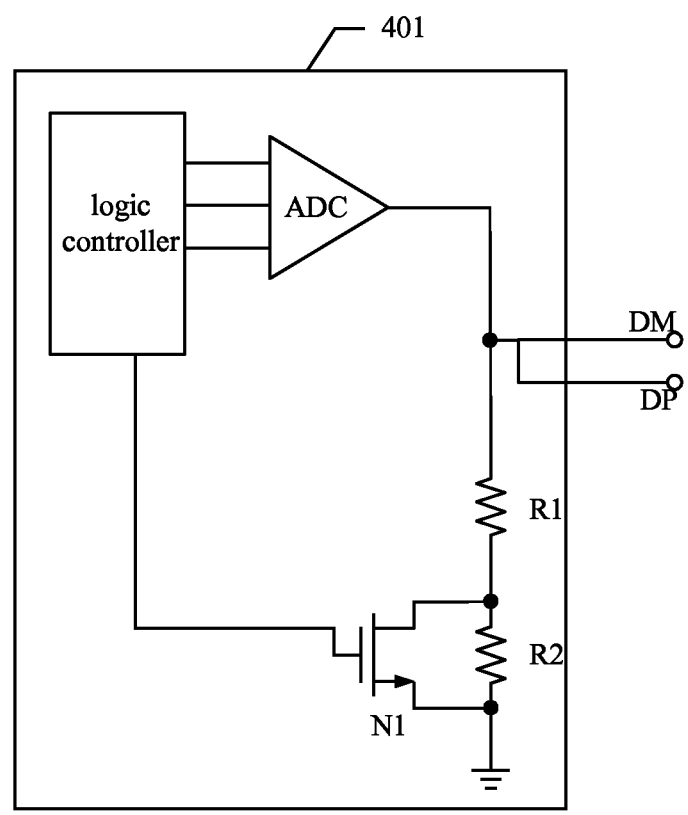
FIG. 7 schematically illustrates a structure of a detecting circuit according to another embodiment of the present disclosure.

It can be understood that, in some embodiments of the present disclosure, the comparators in the detecting circuit 401 may be replaced by ADC (Analog-Digital Conversion) circuit. Referring to FIG. 7, a detecting circuit 401 according to another embodiment of the present disclosure is illustrated.

As shown in FIG. 7, the resistor includes a first resistor R1 and a second resistor R2. The chargeable device is adapted to sends a detecting current $I_0$ to the charger through a variable current source, thus a voltage drop of the resistor is $U_0$, wherein $U_0=I_0\times(R1+R2)$.

The ADC circuit is configured to collect the voltage drop $U_0$ of the resistor, and send the collected voltage drop to a logic controller. The logic controller is configured to: compare a value of the voltage drop $U_0$ collected by the ADC circuit with a preset voltage value; and when the value voltage drop $U_0$ is larger than the preset voltage value, start recording time. Furthermore, when a value recorded by the logic controller reaches a preset value, such as 1s, a high level signal is sent to the gate of the NMOS transistor N1, so as to switch on the NMOS transistor N1.

In some embodiments of the present disclosure, the preset voltage value is equal to that of VT1. In other words, when the value of the voltage drop of the resistor sent by the ADC circuit and obtained by the logic controller is $U_0$ and $U_0=I_0\times(R1+R2)$, the logic controller starts to time.

The second resistor R2 is coupled with the source and the drain of the NMOS transistor N1, thus when the NMOS transistor N1 is switched on, the second resistor R2 is shorted. In this case, the voltage drop corresponding to the detecting current is U', wherein $U'=I_0\times R1$, and $VT0<U'<VT1$.

As the charger and the chargeable device are connected, when the voltage drop of the detecting circuit is reduced, that is, the voltage on the DM/DP pin of the charger is reduced to U', the voltage on the DM/DP pin of the chargeable device is reduced to U' as well. In this case, the charger currently connected is determined as able to receive the control current. Thus, the chargeable device sends the control current to the charger, wherein a current value of the control current is I.

When the chargeable device sends a control current, which has a current value of I, a voltage drop U of the resistor is collected by the ADC circuit, wherein $U=I\times R1$. As a value of the R1 is known, the current value I of the control current can be obtained when the voltage drop U is collected by the ADC circuit. Accordingly, a value of the output voltage of the charger corresponding to the current value I of the control current can be obtained according to the preset relation, wherein the present relation represents correlations between current values and voltage values. Thereafter, the obtained value of the output voltage is sent to the feedback unit 402.

For example, supposing the voltage drop U of the resistor collected by the ADC circuit is 2V (i.e. U=2V), and R1=1KΩ. In this case, the current value I of the control current is 2 mA (i.e. I=2 mA). According to Table 2, it can be seen that the voltage value corresponding to 2 mA is 4V. Thereafter, the ADC circuit sends the voltage value 4V corresponding to the current value of the control current to the feedback unit 402.

Figure 8:
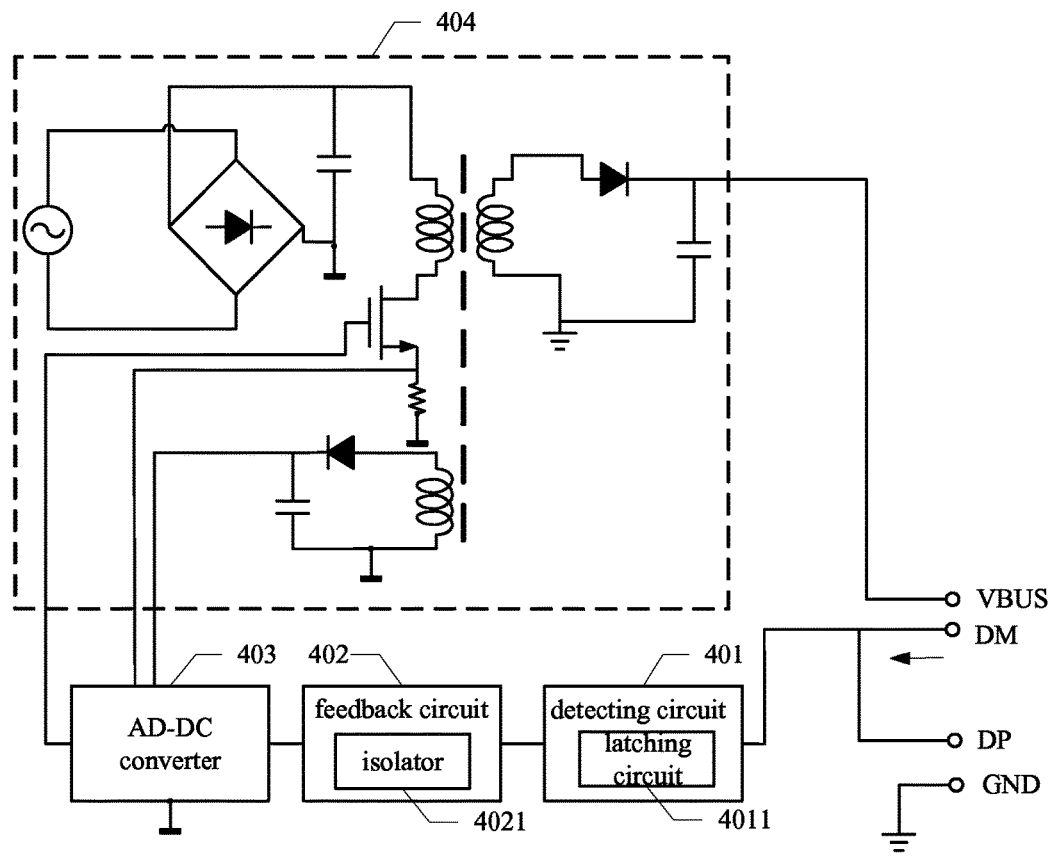
FIG. 8 schematically illustrates a structure of a charger according to one embodiment of the present disclosure.

Referring to FIG. 8, a structure of a charger according to one embodiment of the present disclosure is illustrated. The charger includes: a detecting circuit 401, a feedback circuit 402, an AC-DC converter 403, and a switching power supply circuit 404.

The detecting circuit 401 includes a latching circuit 4011, wherein the latching circuit 4011 is configured to latch a present state of the charger, such as, a present output voltage of the charger. The feedback circuit 402 includes an isolator 4021, wherein the isolator 4021 is adapted to physically isolate the detecting circuit 401 and the AC-DC converter 403. The detecting circuit 401 is connected with a DM/DP pin of the charger, so as to receive a current from the chargeable device through the DM/DP pin.

Figure 9:
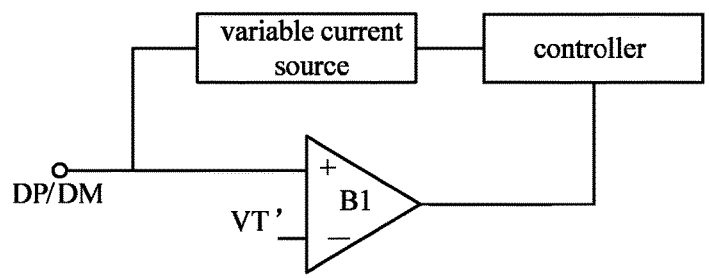
FIG. 9 schematically illustrates a structure of a chargeable device according to one embodiment of the present disclosure.

Referring to FIG. 9, a structure of a chargeable device according to one embodiment of the present disclosure is illustrated. The chargeable device includes: a variable current source, a controller, and a comparator B1. The comparator B1 has a first terminal input with a voltage on the DM/DP pin, and a second terminal input with a threshold value VT' of the comparator B1. The chargeable device and the charger are connected through the DM/DP pin.

In some embodiments of the present disclosure, under control of the controller, the variable current source is adapted to output control currents having different current values and sent the control current to the charger.

In some embodiments of the present disclosure, VT' may be have a value ranging from $I_0 \times R1$ to $I_0 \times (R1+R2)$, that is, $I_0 \times R1 < VT' < I_0 \times (R1+R2)$. In some embodiments of the present disclosure, VT'=VT1. In some embodiments of the present disclosure, VT' may have any other values according to practical requirements, which will not be described in detail herein.

In some embodiments of the present disclosure, the comparator B1 may be replaced by an ADC circuit. The ADC circuit is configured to obtain a voltage drop on the detecting circuit of the charger, and send the voltage drop to the controller where a comparison between the voltage drop and $U_0$ is implemented. Specifically, when the voltage drop on the detecting circuit is smaller than $U_0$, the charger is determined as capable of receiving a control current from the chargeable device, thus the chargeable device can send the control current to the charger.

Moreover, referring to FIG. 5 and FIG. 6, and FIG. 8 and FIG. 9, a detecting process of detecting whether the charger is capable of receiving a control current is as following.

The chargeable device is adapted to control the variable current source through the controller to send control currents having different current values. During a charging process, a detecting current $I_0$ can be generated by the variable current source under control of the controller, and be sent to the charger via the DM/DP pin. The detecting circuit 401 of the charger receives the detecting current $I_0$ sent from the variable current source via the DM/DP pin.

Accordingly, a voltage drop of the resistor in the detecting circuit 401 is $U_0$, wherein $U_0 = I_0 \times (R1+R2)$, and $U_0 > VT1$. In other words, a voltage on the DM/DP pin is $U_0$. Moreover, in the chargeable device, a first terminal of the comparator B1 is input with the voltage on the DM/DP pin, and a second terminal of the comparator B1 is input with VT1, thus the comparator B1 generates a high level signal and sends it to a logic controller.

The logic controller of the charger is configured to: start recording time if at least the comparator A0 and the comparator A1 are detected outputting the high level signal; and send the high level signal to the gate of the NMOS transistor N1 when the recorded time reaches a preset value T. Thus, the NMOS transistor N1 is switched on.

As shown in FIG. 5, the second resistor R2 is coupled with the source and the drain of the NMOS transistor N1, thus the second resistor R2 is shorted when the NMOS transistor N1 is switched on. In this case, the voltage drop in the charger is U', wherein $U'=I_0 \times R1$, and $VT0 < U' < VT1$. It can be seen that, after the second resistor R2 is shorter, in the n+1 comparator, only the comparator A0 outputs the high level, the other comparators all output the low level.

As the charger and the chargeable device are connected, when the voltage drop of the resistor in the detecting circuit is reduced to U', the voltage on the DM/DP pin of the charger is reduced to U' as well. Correspondingly, the voltage on the DM/DP pin of the chargeable device is reduced to U'. Moreover, the first terminal of the comparator B1 is input with the voltage on the DM/DP pin, and the second terminal of the comparator B1 is input with VT1 which is the threshold value of the comparator A1. Accordingly, when the voltage on the DM/DP pin changes, the comparator generates a low level signal and sends the low level signal to the controller. When the low level signal is received by the controller, the charger is determined as capable of receiving the control current.

Referring to FIG. 8 and FIG. 9, during a charging process, operations implemented by the charger and by the chargeable device are respectively illustrated as following.

Figure 10:
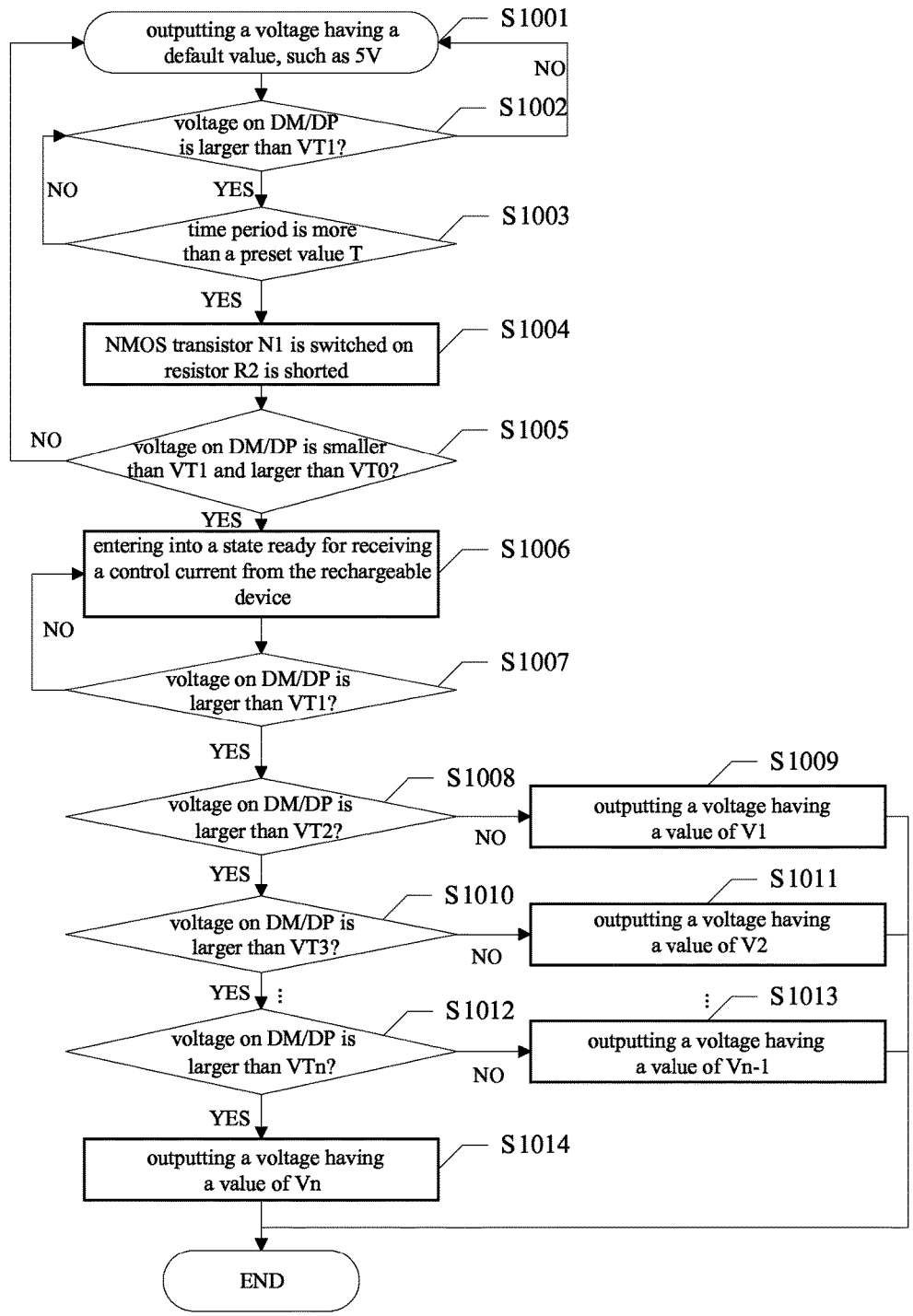
FIG. 10 schematically illustrates a working flow chart of a charger according to one embodiment of the present disclosure.

Referring to FIG. 10, an operation flow chart of the charger during a charging process according to one embodiment of the present disclosure is illustrated. The operations of the charger includes following steps from step S1001 to step S1014.

In step S1001, outputting a voltage having a default value, such as 5V.

In some embodiments of the present disclosure, the default value is 5V. In some embodiments of the present disclosure, the default value may be any other value, which will not be described in detail.

In step S1002, determining whether a voltage on the DM/DP pin is larger than VT1.

In some embodiments of the present disclosure, when the voltage of the DM/DP pin is larger than VT1, step S1003 is implemented; and when the voltage of the DM/DP pin is smaller than VT1, step S1001 is implemented.

In step S1003, determining whether a time period, during which the voltage on the DM/DP pin is greater than VT1, is more than a preset value T.

In some embodiments of the present disclosure, when the time length, during which the voltage on the DM/DP pin is larger than VT1, is more than the preset value T, step S1004 is implemented; and when the time length, during which the voltage on the DM/DP pin is larger than VT1, is less than the preset value T, step S1002 is implemented.

In step S1004, switching on the NMOS transistor N1, so as to short the resistor R2.

After the NMOS transistor N1 is switched on, the resistor R2 is shorted, then step S1005 is implemented.

In step S1005, determining whether the voltage on the DM/DP pin is smaller than VT1 and larger than VT0.

When the voltage on the DM/DP pin is determined as smaller than VT1 and larger than VT0, step S1006 is implemented; and when the voltage on the DM/DP pin is determined as not smaller than VT1 and larger than VT0, step S1001 is implemented.

In step S1006, entering into a state ready for receiving a control current from the chargeable device.

In step S1007, determining whether the voltage on the DM/DP pin is larger than VT1.

In some embodiments of the present disclosure, when the voltage on the DM/DP pin is determined as larger than VT1, step S1008 is implemented; and when the voltage on the DM/DP pin is determined as smaller than VT1, step S1006 is implemented.

In step S1008, determining whether the voltage on the DM/DP pin is larger than VT2.

In some embodiments of the present disclosure, when the voltage on the DM/DP pin is determined as larger than VT2, step S1010 is implemented; and when the voltage on the DM/DP pin is determined as smaller than VT2, step S1009 is implemented.

In step S1009, outputting a voltage having a value of V1.

In step S1010, determining whether the voltage on the DM/DP pin is larger than VT3.

In some embodiments of the present disclosure, when the voltage on the DM/DP pin is determined as larger than VT3, step S1012 is implemented; and when the voltage on the DM/DP pin is determined as smaller than VT3, step S1011 is implemented.

In step S1011, outputting a voltage having a value of V2.

Similarly, keep respectively comparing the voltage on the DM/DP pin with the threshold values of the comparators A4, A5, A6, . . . , An, and correspondingly output a voltage having a value of V4, V5, V6, . . . , Vn.

In step S1012, determining whether the voltage on the DM/DP pin is larger than VTn.

In some embodiments of the present disclosure, when the voltage on the DM/DP pin is determined as larger than VTn, step S1014 is implemented; and when the voltage on the DM/DP pin is determined as smaller than VTn, step S1013 is implemented.

In step S1013, outputting a voltage having a value of Vn−1.

In step S1014, outputting a voltage having a value of Vn.

Accordingly, through steps from S1001 to S1014, an output voltage of the charger can be adjusted according to a current sent from the chargeable device.

Figure 11:
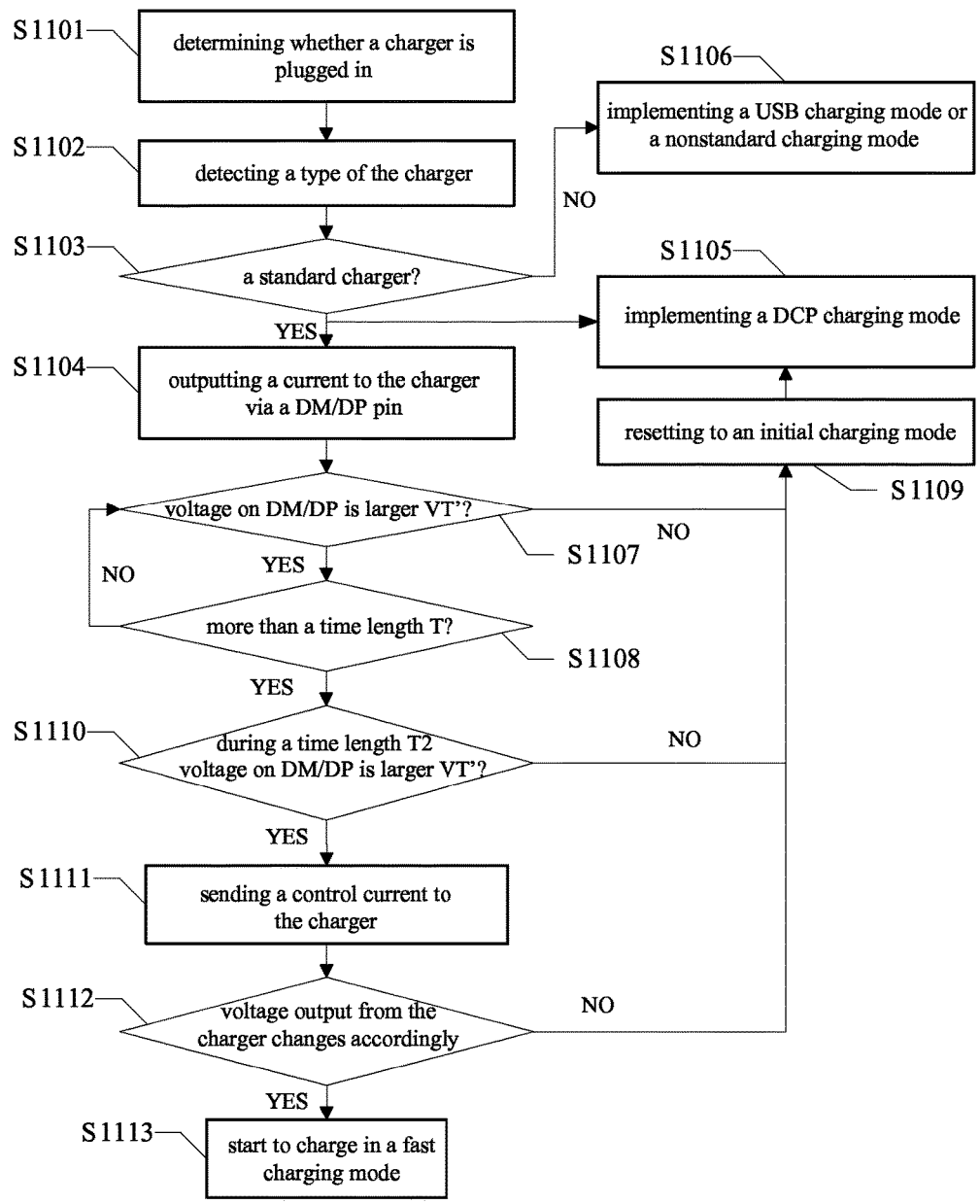
FIG. 11 schematically illustrates a working flow chart of a chargeable device according to one embodiment of the present disclosure.

Referring to FIG. 11, an operation flow chart of the chargeable device during a charging process according to one embodiment of the present disclosure is illustrated. The operations of the chargeable device includes following steps from step S1101 to step S1113.

In step S1101, determining whether a charger is plugged in.

In step S1102, detecting a type of the charger.

In some embodiments of the present disclosure, the type of the charger is detected by way of BC1.2. BC1.2 refers to a detecting method of Battery Charger Specification Revision version 1.2.

In step S1103, determining whether the charger is an international standard charger.

It can be understood that, in some embodiments of the present disclosure, any other ways may be employed to determine if the charger is the international standard charger, which will not be described in detail.

In some embodiments of the present disclosure, the international standard charger refers to a charger having a standard number of YD/T1591-2006. In some embodiments of the present disclosure, the international standard charger may refer to a charger having any other standard numbers, which will not be described in detail.

In some embodiments of the present disclosure, when the charger is the international standard charger, step S1104 or step S1105 is implemented; and when the charger is not the international standard charger, step S1106 is implemented.

In step S1104, outputting a current to the charger via a DM/DP pin.

In some embodiments of the present disclosure, after the current is inputting into the charger via the DM/DP pin, step S1107 is implemented.

In step S1105, implementing a DCP (Dedicated Charging Port) charging mode, wherein the DCP charging mode matches with the international standard charger.

In step S1106, implementing a USB charging mode or a nonstandard charging mode.

In step S1107, determining whether a value of a voltage on the DM/DP pin is larger than that of the VT'.

In some embodiments of the present disclosure, when the value of the voltage on the DM/DP pin is larger than that of the VT', step S1108 is implemented; and when the value of the voltage on the DM/DP pin is smaller than that of the VT', step S1109 is implemented.

In step S1108, determining whether a time length, during which the value of the voltage on the DM/DP pin is larger than that of the VT', reaches a preset time length T.

In step S1109, resetting to an initial charging mode.

In step S1110, determining whether the value of the voltage on the DM/DP pin is smaller than that of the VT' during a time length T2.

In some embodiments of the present disclosure, when the value of the voltage on the DM/DP pin is continuously smaller than that of the VT' during the time length T2, step S1111 is implemented; and when the value of the voltage on the DM/DP pin is not continuously smaller than that of the VT' during the time length T2, step S1109 is implemented.

In step S1111, sending a control current to the charger.

In some embodiments of the present disclosure, a current value of the control current may be selected according to a preset relation, wherein the present relation represents correlations between current values and voltage values, thus controlling the charger to output a voltage having a corresponding voltage value.

In step S1112, detecting whether the voltage output from the charger is changed accordingly.

In some embodiments of the present disclosure, if the voltage output from the charger is not changed accordingly, the step S1109 is implemented; and if the voltage output from the charger is changed accordingly, the step S1113 is implemented.

In step S1113, implementing a larger current charging mode.

Figure 12:
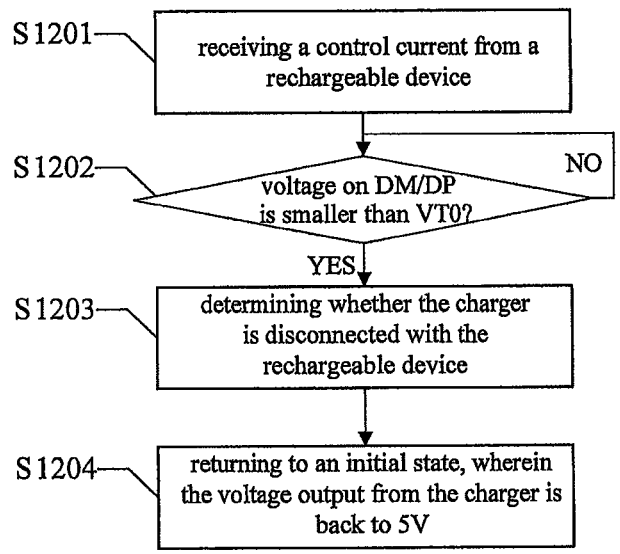
FIG. 12 schematically illustrates a working flow chart of a charger according to another embodiment of the present disclosure.

Referring to FIG. 12, a working flow chart of a charger according to one embodiment of the present disclosure is illustrated, which includes following steps from S1201 to S1204.

In step S1201, receiving a control current from a chargeable device.

In step S1202, determining whether the value of the voltage on the DM/DP pin is smaller than VT0.

In some embodiments of the present disclosure, when the value of the voltage on the DM/DP pin is smaller than VT0, step S1203 is implemented; and when the value of the voltage on the DM/DP pin is not smaller than VT0, keep implementing the step S1202.

In step S1203, determining whether the charger is disconnected with the chargeable device.

In step S1204, returning to an initial state, wherein the voltage output from the charger is back to 5V.

Figure 13A:
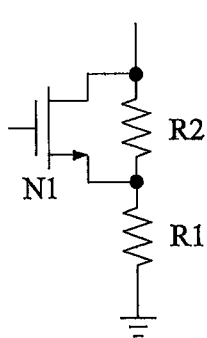
FIG. 13A through FIG. 13C schematically illustrate a connecting relation between a NMOS transistor and a drawdown resistor according to one embodiment of the present disclosure.
Figure 13B:
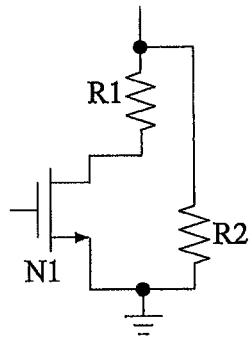
Figure 13C:
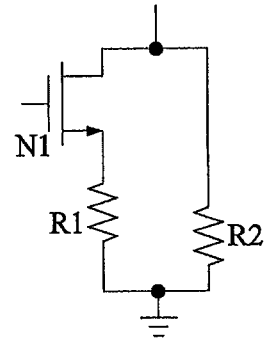

In some embodiments of the present disclosure, connecting relations between the NMOS transistor N1 of the switching unit and the resistor R1, R2 are not limited to that described above. Referring to FIG. 13A through FIG. 13C, connecting relations between the NMOS transistor N1 of the switching unit and the resistor R1, R2 according to some other embodiments of the present disclosure is illustrated.

As shown in FIG. 13A, a first end of the resistor R1 is coupled with the source of the NMOS transistor N1, and a second end of the resistor R1 is connected to ground. A first end of the resistor R2 is coupled with the drain of the NMOS transistor N1, and a second end of the resistor R2 is coupled with the source of the NMOS transistor N1. The gate of the NMOS transistor N1 is coupled with the logic controller, and the drain of the NMOS transistor N1 is coupled with first ends of the comparators. Accordingly, when the gate of the NMOS transistor N1 receives a control instruction from the logic controller, the NMOS transistor N1 is switched on, and R2 is shorted.

As shown in FIG. 13B, a first end of the resistor R1 is coupled with first ends of the comparators, and a second end of the resistor R1 is coupled with the drain of the NMOS transistor N1. A first end of the resistor R2 is coupled with a first end of the resistor R1, and a second end of the resistor R2 is connected to ground. The gate of the NMOS transistor N1 is coupled with the logic controller, and the source of the NMOS transistor N1 is grounded. Accordingly, when the NMOS transistor N1 is switched off, a resistance of the resistor is R, wherein R=R2; and when the NMOS transistor N1 is switched on, the resistor R1 and the resistor R2 are connected in a parallel mode, the resistance of the resistor R=(R1×R2)/(R1+R2).

As shown in FIG. 13C, a first end of the resistor R1 is coupled with the source of the NMOS transistor N1, and a second end of the resistor R1 is connected to ground. A first end of the resistor R2 is coupled with the drain of the NMOS transistor N1, and a second end of the resistor R2 is grounded. The gate of the NMOS transistor N1 is coupled with the logic controller, and the drain of the NMOS transistor N1 is coupled with first ends of the comparators. Accordingly, when the NMOS transistor N1 is switched off, a resistance of the resistor is R, wherein R=R2; and when the NMOS transistor N1 is switched on, the resistor R1 and the resistor R2 are connected in a parallel mode, the resistance of the resistor R=(R1×R2)/(R1+R2).

In some embodiments of the present disclosure, when a charging process is finished, for example, when the chargeable device and the charger are disconnected, the output voltage of the charger may be adjusted to a high value. For example, when the chargeable device and the charger are disconnected, the output voltage of the charger is 12V. However, when using this charger, which has an output voltage of 12V, to charge another chargeable device, for example, to charge a chargeable device which has a nominal input voltage of 5V, the charging process may unable to be implement, or even cause damage to the chargeable device.

In some embodiments of the present disclosure, when the chargeable device and the charger are disconnected, the current value of the control current sent from the chargeable device to the charger is zero. In other words, the voltage drop in the detecting circuit is zero, which is smaller than the threshold value of the comparator VT0, wherein VT0=0.1V.

It can be concluded that, when the chargeable device sends a detecting current to the charger, if the voltage drop in the detecting circuit is U', U'=$I_0$×R1, and VT0<U'<VT1, the charger is determined as ready for receiving a control current. In other words, when the voltage drop in the detecting circuit is smaller than VT1 and larger than VT0, then the charger determined as in a standby state that ready for receiving a control current from the chargeable device. Further, if the voltage drop in the detecting circuit is smaller than VT0, then the charger and the chargeable device are determined as being disconnected with each other, that is, the charger is unplugged from the chargeable device.

When the charger and the chargeable device are determined as being disconnected with each other, the value of the output voltage of the charger is reset to the default value by the voltage converter. For example, the output voltage of the charger is reset to 5V, thus the charger is back to the initial state.

According to one embodiment of the present disclosure, a charging system is also provided. The charging system includes a charger and a chargeable device.

The chargeable device is configured to send a control current to the charger.

The charger is configured to: acquire a first voltage value corresponding to a first current value of the control current according to a preset relation, wherein the present relation represents correlations between current values and voltage values; and adjust a voltage value of an output voltage of the charger into the first voltage value corresponding to the first current value of the control current.

It can be understood by person skilled in the art that, some or all the steps in the methods or processes recited above may be implemented by hardware under instructions of programs. The programs may be stored in a storage medium accessible for a computer. The storage medium may include: a ROM (Read Only Memory), a RAM (Random Access Memory), a disc, or a light disk.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A charging apparatus, comprising:
   a first acquiring unit configured to acquire a first current value of a control current from a chargeable device;
   a second acquiring unit configured to acquire a first voltage value corresponding to the acquired first current value of the control current based on a preset relation, wherein the preset relation represents correlations between current values and voltage values; and
   an adjusting unit configured to adjust a voltage value of an output voltage of a charger to the first voltage value corresponding to the first current value of the control current.

2. The charging apparatus according to claim 1, further comprising a detecting unit, wherein the detecting unit is configured to: receive a detecting current from the chargeable device; and send a feedback signal to the chargeable device when a time period of receiving the detecting current reaches a preset value.

3. The charging apparatus according to claim 1, further comprising a resetting unit, wherein the resetting unit is configured to: reset the value of the output voltage of the charger into a default value when the acquired first current value of the control current becomes zero.

4. A charger, comprising: a detecting circuit, a feedback circuit and a voltage converter;
   wherein the detecting circuit comprises a comparing unit and a resistor;
   wherein the resistor has a first end coupled with a current input terminal of the charger, and a second end coupled with ground;
   wherein the comparing unit comprises at least four comparators which have different threshold values, first input terminals of the at least four comparators are all input with a voltage drop of the resistor, second input terminals of the at least four comparators are respectively input with the threshold values thereof, and output terminals of the at least four comparators are all coupled with the feedback circuit;

wherein the feedback circuit is disposed between the detecting circuit and the voltage converter, and is configured to: convert comparison results output from the at least four comparators into control signals, and send the control signals to the voltage converter; and wherein the voltage converter is coupled with the feedback circuit, and is configured to adjust an output voltage of the charger based on the control signals.

5. The charger according to claim 4, wherein the detecting circuit further comprises a logic controller and a switching unit;

wherein the logic controller is coupled with the output terminals of the comparators, and is configured to: receive the comparison results from the comparators, start recording time if the threshold values of at least two of the comparators are less than a value of the voltage drop of the resistor, and switch on the switching unit when the recorded time reaches a preset value; and wherein the switching unit is coupled with the logic controller, and is configured to reduce a resistance of the resistor when being switched on.

6. The charger according to claim 5, wherein the switching unit comprises any one of: a NMOS transistor, a PMOS transistor, a triode, and an electric relay.

7. The charger according to claim 5, wherein the switching unit comprises a NMOS transistor, the resistor comprises a first resistor and a second resistor;

wherein the first resistor has a first end coupled with the first input terminals of the at least four comparators, and a second end coupled with a drain of the NMOS transistor;

wherein the second resistor has a first end coupled with the drain of the NMOS transistor, and a second end coupled with ground; and wherein the NMOS transistor has a gate coupled with the logic controller, and a source coupled with ground.

8. The charger according to claim 5, wherein the switching unit comprises a NMOS transistor, the resistor comprises a first resistor and a second resistor;

wherein the first resistor has a first end coupled with a source of the NMOS transistor, and a second end coupled with ground;

wherein the second resistor has a first end coupled with a drain of the NMOS transistor and the first input terminals of the at least four comparators, and a second end coupled with the source of the NMOS transistor; and wherein the NMOS transistor has a gate coupled with the logic controller.

9. The charger according to claim 5, wherein the switching unit comprises a NMOS transistor, the resistor comprises a first resistor and a second resistor;

wherein the first resistor has a first end coupled with the first input terminals of the at least four comparators, and a second end coupled with a drain of the NMOS transistor;

wherein the second resistor has a first end coupled with the first end of the first drawdown resistor, and a second end coupled with a source of the NMOS transistor; and wherein a gate of the NMOS transistor is coupled with the logic controller, and the source of the NMOS transistor is coupled with ground.

10. The charger according to claim 5, wherein the switching unit comprises a NMOS transistor, the resistor comprises a first resistor and a second resistor;

wherein the first resistor has a first end coupled with a source of the NMOS transistor, and a second end coupled with ground;

wherein the second resistor has a first end coupled with a drain of the NMOS transistor, and a second end coupled with ground; and wherein a gate of the NMOS transistor is coupled with the logic controller, the drain of the NMOS transistor is coupled with the first input terminals of the at least four comparators.

11. The charger according to claim 4, wherein the voltage converter comprises an AC-DC converter, or a DC-DC converter.

12. The charger according to claim 4, wherein the voltage converter comprises an AC-DC converter, and the feedback circuit comprises an isolator which is configured to physically isolate the AC-DC converter and the detecting circuit.

13. The charger according to claim 12, wherein the isolator comprises a light coupling device.

14. A chargeable device, comprising a variable current source and a controller;

wherein the controller is configured to control the variable current source to output a control current having a controlled current value; and wherein the variable current source is configured to send the control current with the controlled current value to a charger based on a control instruction from the controller.

15. The chargeable device according to claim 14, further comprising a comparator, wherein the comparator has a first input terminal input with a voltage drop of a detecting circuit in the charger, and a second input terminal input with a threshold value of the comparator; and wherein the comparator is configured to compare a value of the voltage drop in the detecting circuit and the threshold value of the comparator, and send a comparison result to the controller.

16. The chargeable device according to claim 14, further comprising an ADC circuit, wherein the ADC circuit is coupled with the controller; and wherein the ADC circuit is configured to obtain the voltage drop of the detecting circuit, and send the voltage drop in the detecting circuit to the controller.

17. A charging system, comprising a charger and a chargeable device;

wherein the chargeable device is configured to send a control current to the charger; and wherein the charger is configured to: acquire a first voltage value corresponding to a first current value of the control current based on a preset relation, wherein the preset relation represents correlations between current values and voltage values, and adjust a voltage value of an output voltage thereof to the first voltage value corresponding to the first current value of the control current.

* * * * *